United States Patent [19]

Berry et al.

[11] 4,302,427
[45] Nov. 24, 1981

[54] RECOVERY OF URANIUM FROM WET-PROCESS PHOSPHORIC ACID

[75] Inventors: William W. Berry, Lakeland, Fla.; Angus V. Henrickson, Golden, Colo.

[73] Assignee: International Minerals & Chemical Corporation, Northbrook, Ill.

[21] Appl. No.: 22,079

[22] Filed: Mar. 19, 1979

[51] Int. Cl.³ .................. C01G 43/01; B01D 11/04
[52] U.S. Cl. .................................... 423/10; 210/634; 423/16; 423/253; 423/260
[58] Field of Search .............. 423/8, 10, 11, 260, 423/261, 16, 253; 210/21

[56] References Cited

U.S. PATENT DOCUMENTS

| | | | |
|---|---|---|---|
| 2,819,145 | 1/1958 | McCollough et al. | 423/10 |
| 2,859,094 | 11/1958 | Schmitt et al. | 423/10 |
| 3,052,513 | 9/1962 | Crouse | 423/10 |
| 3,052,514 | 9/1962 | Schmitt | 423/10 |
| 3,100,682 | 8/1963 | Kelmers | 423/8 |
| 3,711,591 | 1/1973 | Hurst et al. | 423/10 |
| 3,737,513 | 6/1973 | Wiewiorowski | 423/8 |
| 3,835,214 | 9/1974 | Hurst et al. | 423/10 |
| 3,966,872 | 6/1976 | Sundar | 423/9 |
| 3,966,873 | 6/1976 | Elikan et al. | 423/10 |
| 4,002,716 | 1/1977 | Sundar | 423/10 |
| 4,024,215 | 5/1977 | Caropreso et al. | 423/260 |
| 4,087,512 | 5/1978 | Reese et al. | 423/321 R |
| 4,105,741 | 8/1978 | Wiewiorowski | 423/10 |

OTHER PUBLICATIONS

Caropreso et al., "Hydrogen Peroxide Precipitation of Uranium . . . ", Trans. Soc. Mining Eng. AIME 254(4), pp. 281-284 (1973).

Galkin et al., *Technology of Uranium*, AEC-tr-6638, pp. 170-187, 1964.

Harrington et al., Eds., *Uranium Production Technology*, Van Nostrand Company, Inc., Princeton, N.J., 1959, pp. 157-159.

Hurst, "Recovery of Uranium from Wet-Process Phosphoric Acid" *I & EC Process Design and Development*, vol. II, No. 1, pp. 122-128 (1972).

Shabir, U.S. Bureau of Mines Report of Investigations-RI 7931 (1974).

Hurst, "Recovering Uranium from Wet-Process Phosphoric Acid", *Chem. Eng.* (Jan. 3, 1977) pp. 56-57.

Hurst, ORNL-TM-2522 (1960).

Hurst, ORNL-2952 (1960).

Bunus, "Synergistic Extraction Of Uranium . . . ", *J. Inorg. Nucl. Chem.*, vol. 40, pp. 117-121 (1977).

*Primary Examiner*—Deborah L. Kyle
*Attorney, Agent, or Firm*—Schuyler, Banner, Birch, McKie & Beckett

[57] ABSTRACT

Uranium values are recovered as uranyl peroxide from wet process phosphoric acid by a solvent extraction-precipitation process. The preferred form of this process comprises a first solvent extraction with DEPA-TOPO followed by reductive stripping of the extractant with $Fe^{++}$ - containing phosphoric acid. After reoxidation, the uranium-containing aqueous stripping solution is extracted again with DEPA-TOPO and the pregnant organic is then stripped with a dilute ammonium carbonate solution. The resulting ammonium uranyl tricarbonate solution is then acidified, with special kerosene treatment to prevent wax formation, and the acidified solution is reacted with $H_2O_2$ to precipitate a uranyl peroxide compound.

14 Claims, 1 Drawing Figure

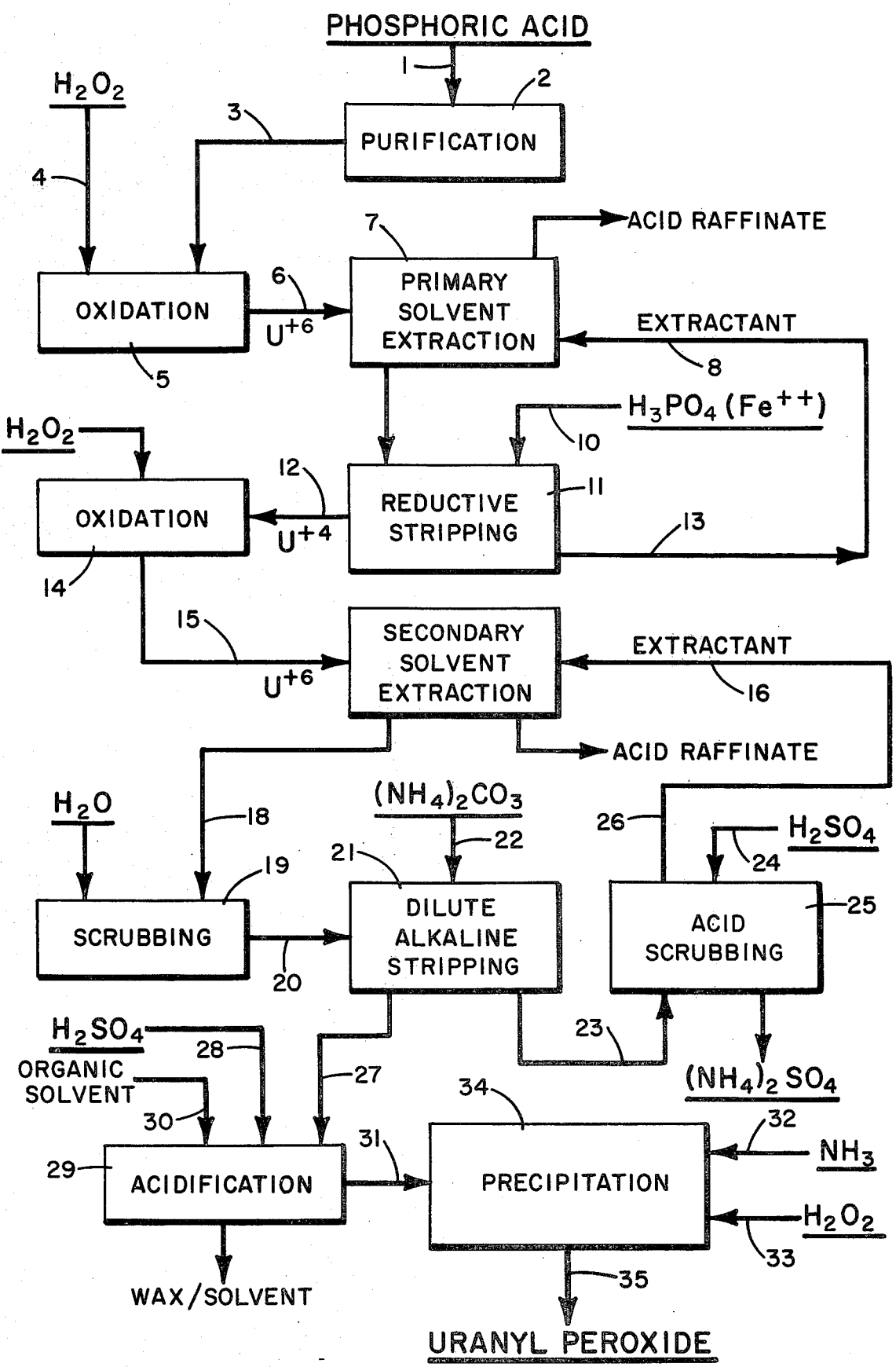

RECOVERY OF URANIUM FROM WET-PROCESS PHOSPHORIC ACID

The mining of phosphate rock such as that found in Florida and many countries of the world, e.g., Morocco has as its prime objective the production of phosphate-containing fertilizer. In one widely used process, the phosphate values are recovered from the rock by digestion with sulfuric acid to produce a phosphoric acid solution (called wet-process phosphoric acid) and an insoluble calcium sulfate (gypsum). Phosphate rock may contain significant quantities of uranium, e.g., on the order of from about 0.1 to 0.5 pounds of uranium per ton of phosphate rock mined and more generally within the range of about 0.2 to about 0.4 pounds per ton. During the digestion step the uranium values are solubilized resulting in a uranium concentration (expressed as $U_3O_8$) in the wet-process phosphoric acid of from about 0.05 to about 0.3 grams per liter and more generally from about 0.15 to about 0.25 grams per liter.

Attempts to recover uranium values from wet-process phosphoric acid have centered on the use of solvent extraction processes in which the uranium values are transferred to an organic phase, stripped from the organic phase and subsequently recovered as a uranium precipitate. The uranium-free wet-process phosphoric acid is then processed conventionally to form various phosphate-containing fertilizer products.

The uranium solvent extraction process which has generated the most commercial interest is the so-called reductive stripping extraction process developed by Oak Ridge National Laboratories (ORNL). See Hurst, U.S. Pat. No. 3,711,591; Hurst, et al, "Recovery of Uranium from Wet-Process Phosphoric Acid", I & EC Process Design and Development, Vol. II, p. 122–128, January 1972; Hurst et al, "Recovering Uranium from Wet-Process Phosphoric Acid", Chemical Engineering, Jan. 3, 1977, p. 56–57; See also, Hurst et al, ORNL-TM-2522 (1969) and Hurst et al, ORNL-2925 (1960). The ORNL process as described in the Hurst '591 patent employs a synergistic extraction mixture of di(2-ethylhexyl) phosphoric acid (DEPA) and trioctylphosphine oxide (TOPO) dissolved in an organic diluent. This extraction mixture is known to have a high affinity for uranium in the hexavalent oxidation state.

In the process described in the Hurst patent, wet-process acid is first subjected to oxidation conditions to convert the uranium to the hexavalent state and then contacted in a first extraction cycle with DEPA-TOPO. The pregnant organic phase is then treated with an aqueous phosphoric acid stripping solution containing ferrous ions in an amount sufficient to reduce the uranium values in the mixture to the quadrivalent state. In the quadrivalent form the uranium values have substantially no affinity for the organic phase and are transferred into the aqueous strip solution. After reoxidation of uranium values to the hexavalent state, the acidic strip solution is fed to a second extraction cycle where it is contacted with a more dilute DEPA-TOPO extractant to retransfer the concentrated uranium values into the organic phase. After scrubbing to remove entrained aqueous materials, the pregnant organic extractant is stripped with an ammonium carbonate solution which causes transfer of uranium values to the aqueous phase and simultaneous precipitation of insoluble ammonium uranyl tricarbonate (AUT). The resulting AUT slurry is then filtered, washed and calcined to produce a dry uranium concentrate.

One of the problems associated with the ORNL process is metallic contamination resulting from the coextraction and coprecipitation of metals such as iron present in the orginal acid. For nuclear fuel applications high amounts of iron contamination are intolerable. Sundar, U.S. Pat. No. 4,002,716 attempts to obviate the problem of iron contamination by stripping the uranium values from the secondary cycle organic extractant with a dilute ammonium carbonate solution containing sulfide ions. Under these conditions the AUT complex remains soluble and iron values are said to precipitate as iron sulfides. After filtration of the iron sulfides, the AUT complex is treated with additional quantities of ammonia and carbon dioxide to raise the ammonium carbonate concentration to a level at which AUT precipitation occurs. This AUT product can then be washed and calcined according to the ORNL process.

Applicants have surprisingly discovered that uranium having reduced metallic contamination can be more efficiently recovered from wet-process phosphoric acid by modifying the ORNL process to provide a dilute carbonate strip solution which can be subsequently acidified and reacted with $H_2O_2$ to precipitate uranium peroxide.

The present invention provides a process for recovering uranium from wet-process phosphoric acid containing hexavalent uranium values which comprises the steps of: (a) contacting said acid with an organic extractant comprising a mixture of di(2-ethylhexyl) phosphoric acid and trioctylphosphine oxide in a phosphoric acid-immiscible organic solvent and separating the resulting uranium loaded primary extractant from the lean acid; (b) contacting said uranium loaded primary extractant with a phosphoric acid strip solution containing dissolved $Fe^{++}$ and separating the resulting $U^{+4}$ loaded acid strip solution from said organic extractant; (c) contacting said $U^{+4}$ loaded acid strip solution with an oxidizing agent to convert the uranium values to the $U^{+6}$ form; (d) contacting the resulting $U^{+6}$ loaded acid strip solution with a second portion of said organic extractant and separating the resulting uranium loaded secondary extractant from the lean acid strip solution; (e) contacting said $U^{+6}$ loaded secondary extractant with a dilute aqueous ammonium carbonate solution and separating the resulting aqueous ammonium uranyl tricarbonate solution from said organic extractant; (f) separating any iron or other impurity-containing precipitates that may form in step (e) from said aqueous ammonium uranyl tricarbonate solution; (g) contacting said aqueous ammonium uranyl tricarbonate solution with an acid to form an aqueous acidic solution having a pH of about 2 and removing from said aqueous acidic solution the $CO_2$ formed as the carbonate ions are destroyed; (h) contacting either the aqueous ammonium uranyl tricarbonate solution or the aqueous acidic solution of step (g) with a water-immiscible, organic solvent for the acidified form di(2-ethylhexyl) phosphoric acid and separating the resulting organic solution from said aqueous acidic solution; and (i) contacting said aqueous acidic solution with hydrogen peroxide at a pH in the range of from about 3.5 to about 4.5 to precipitate a uranyl peroxide compound.

The present invention also provides a process for producing uranium peroxide from an aqueous ammonium uranyl tricarbonate solution obtained by stripping uranium values from an organic extractant containing di(2-ethylhexyl) phosphoric acid with an aqueous ammonium carbonate solution, said process comprising: (a) contacting said aqueous ammonium uranyl tricarbonate solution with an acid to form an aqueous acidic solution having a pH of about 2 and removing from said aqueous acidic solution the $CO_2$ formed as the carbonate ions are destroyed; (b) contacting either the aqueous ammonium uranyl tricarbonate solution or the aqueous acidic solution of step (a) with a water-immiscible, organic solvent for the acidified form di(2-ethylhexyl) phosphoric acid and separating the resulting organic solution from said aqueous acidic solution; and (c) contacting said aqueous acidic solution with hydrogen peroxide at a pH in the range of about 3.5 to 4.5 to precipitate uranium peroxide.

The present invention further provides a process for removing alkaline-soluble ammonium complexes of di(2-ethyhexyl) phosphoric acid from aqueous alkaline uranium-containing solutions which are to be acidified in subsequent processing to recover uranium values, said process comprising: (a) adding a water-immiscible organic solvent for the acidified form of di(2-ethylhexyl) phosphoric acid to said alkaline solution just prior to or during acidification; and (b) separating the resulting di(2-ethylhexyl) phosphoric acid containing organic solution from said aqueous solution.

Precipitation of uranium from an acid medium rather than from the alkaline carbonate medium of the prior art allows for significant control of iron precipitation which in turn permits wider latitude in extractant concentrations in the second cycle of the reductive stripping process. The ORNL process presently employs a 0.5 M DEPA concentration in the first cycle and a 0.3 M DEPA concentration in the second cycle to suppress coextraction of iron. In the process of the present invention, however, 0.5 M DEPA can be employed for both cycles resulting in increased extraction and handling efficiency. The uranium peroxide precipitate has the additional advantage of being convertible to a commercial uranium concentrate by simple drying, thus obviating the need for expensive calcining. Moreover, the uranium peroxide precipitate may be shipped directly to uranium converters as a peroxide slurry.

While processes for treating various uranium-containing solutions to produce uranium peroxide precipitates are known in the prior art, see, for example, Shabbir et al, "Hydrogen Peroxide Precipitation of Uranium," Bureau of Mines Report of Investigations RI-7931 (1974); Caropreso, U.S. Pat. No. 4,024,215, this process has not been used to produce uranium peroxide from alkaline strip solutions generated in the DEPA-TOPO extraction of uranium from wet-process phosphoric acid.

FIG. 1 is a block flow diagram showing the preferred form of the process of the present invention.

The process of the present invention will now be described with reference to FIG. 1. Feed to the process of the present invention via line 1 comprises wet-process phosphoric acid obtained by the sulfuric acid digestion of phosphate rock such as that found in Florida. This commercial wet-process phosphoric acid from the gypsum filter usually runs approximately 28–30% by weight $P_2O_5$.

The first step of the process of the present invention may comprise phosphoric acid purification. Commercially produced wet-process phosphoric acid made from Florida phosphate rock is generally brown in color as a result of contamination with so-called humates. These humates are by-products of decayed vegetable, animal, or other types of organic matter contained in the phosphate rock as mined which transfer to the acid during the digestion step. The feed acid generally also contains various metallic impurities, traces of silica and gypsum solids that have crystallized after filtration. The presence of these impurities may result in significant difficulties during the uranium solvent extraction process, primarily due to the buildup of solids at the interface during phase separation in the extraction process. While the present invention contemplates the recovery of uranium from so-called brown phosphoric acid, it is preferred to subject the brown feed acid to a purification step shown generally at 2 which removes a major portion of potentially interfering contaminants.

While any of the known phosphoric acid purification processes may be employed for the preliminary clean-up step, the preferred method is that described in commonly assigned U.S. application Ser. No. 22,083 entitled "Purification of Phosphoric Acid" filed on even date herewith in the names of Allen and Berry, which is hereby incorporated by reference. The purification method described in that application comprises, in a preferred form, cooling the feed acid, mixing an activated clay such as bentonite with the cooled acid, adding a flocculating agent to the acid-clay mixture to cause impurity sedimentation and thereby producing a partially clarified acid, and feeding the partially clarified acid to an activated carbon column for removal of the remaining impurities. This process produces a low-humic, low solids phosphoric acid (clean acid). When the purification process is operated in the aforementioned manner, the spent carbon material can be readily and efficiently regenerated by the process described in commonly assigned U.S. application Ser. No. 22,082 entitled "Regeneration of Activated Carbon" filed on even date herewith in the names of Allen, Berry and Leibfried, which is hereby incorporated by reference.

The clean acid 3 from the purification step 2 is then treated with an oxidizing agent 4 in oxidizer 5 to convert any $U^{+4}$ present to the $U^{+6}$ form. Various oxidizing agents such as sodium chlorate, air and the like, may be employed although the preferred oxidizing agent is hydrogen peroxide. The oxidizing agent should be added to the clean acid in an amount sufficient which insures that any uranium present as $U^{+4}$ is converted $U^{+6}$. Typically, oxidizing agent additions of from about 0.01% to about 0.1% (100% $H_2O_2$) and preferably from about 0.01% to about 0.03% by weight are effective to achieve this result. The progress of uranium oxidation in the clean acid can be controlled by monitoring the conversion of $Fe^{++}$ present in the solution to $Fe^{+++}$. Typically, wet-process acid may contain up to about 10 to 12 grams per liter of total iron (as Fe). The oxidizing agent (e.g., a 50% aqueous solution of hydrogen peroxide) can be added until the $Fe^{++}$ concentration is reduced to a value of less than about 0.1 grams per liter which insures that any $U^{+4}$ originally present is converted to $U^{+6}$. The oxidation step is preferably accomplished in a mixing tank and suitable mixing times can be up to about 5 minutes or more preferably from about 5 to about 15 minutes, although longer periods of time are acceptable.

If the acid has not been cooled as a part of the preferred purification step described above, it should be cooled at some point prior to the primary solvent extraction. Commercially produced acid comes from the gypsum filter at a temperature of about 140°–150° F. In order to maximize the coefficients of extraction for uranium in the subsequent operations, the acid should be cooled to a temperature in the range of from about 100° F. to 130° F. Cooling much below 100° F. requires considerable additional equipment thus resulting in additional capital cost. Preferred is a temperature of about 120° F. This cooling step can precede or follow the above-described oxidation step.

In the next step of the process of the present invention the cooled, clarified, oxidized acid 6 is fed to a primary solvent extraction unit 7 in which it is contacted countercurrently with an immiscible organic extractant 8 to cause transfer of the uranium values into the organic phase. In practice, the extraction is carried out in a number of sequential extraction stages, each comprising a mixer-settler arrangement. In the preferred embodiment all the extraction stages have all aqueous-continuous phase except the last stage which has an organic continuous phase to minimize acid entrainment. The lean aqueous acid streams may be returned to the phosphoric acid plant after suitable treatment to remove entrained organics.

The extractant employed in the process of the present invention is a mixture of di(2-ethylhexyl) phosphoric acid (DEPA) and trioctylphosphine oxide (TOPO) dissolved in an organic diluent such as kerosene. Contact of the uranium-bearing acid solution with this immiscible extractant mixture results in the conversion of uranyl ions to a $UO_2^{++}$-DEPA complex. Typically, the extractant contains about 0.1 to 1 mol per liter of DEPA and about 0.025 to about 0.25 mol per liter of TOPO. The feed acid to extractant ratio by volume is generally in the range of about 0.1 to 10. Contact times generally range from about 1 to 5 minutes, preferably from about 2 to about 3 minutes.

Even when preliminary acid purification is employed, solid impurities (crud) may build up at the phase interface in the settlers (especially in the first extraction stage). While some buildup of this interfacial crud is tolerable, it is preferable to effect continuous removal of this crud layer by the process of commonly assigned U.S. patent application Ser. No. 22,218 entitled "Improved Method For Solvent Extraction of Metallic Mineral Values From Acidic Solutions" filed on even date herewith in the names of Allen and Berry, which is hereby incorporated by reference. In this application a process is described wherein a dispersion of air bubbles is introduced into the mixer which causes the crud to float to the surface in the settler where it is continuously removed for example, by skimming.

The next step of the process of the present invention is reductive stripping. In this step the pregnant organic 9, which now contains from about 0.2 to about 0.6, and more generally from about 0.3 to about 0.5 grams per liter of uranium values in the hexavalent state, is contacted with a $Fe^{+2}$—containing phosphoric acid stripping solution 10 in a stripping vessel 11 to cause transfer of the uranium values into the aqueous phase. During the reductive stripping ferrous ion is oxidized to ferric ion and the DEPA-complexed uranyl ion is reduced to the $U^{+4}$ ion. Since the DEPA has very little affinity for the quadrivalent uranium species, the $U^{+4}$ ion concentrates in the aqueous stream. Typical loadings in the stripping acid are from about 10 to about 12 grams per liter (as U).

Stripping solution 10 (substantially uranium free) should have a $P_2O_5$ concentration of about 28% to 32% $P_2O_5$ by weight, and preferably about 29% to about 30%, and a ferrous ion concentration of at about 25 to about 45 grams and preferably about 35 to about 40 grams per liter as $Fe^{+2}$. Loaded strip solution 12 (i.e., containing uranium) should contain an excess ferrous concentration of about 14 to about 17 grams per liter, more preferably about 15 to about 17 grams per liter. The strip acid can be conveniently prepared by adding ground metallic iron at a suitable rate, e.g., about 0.2 to about 0.3 pounds per gallon to the acid in a preparatory step. (The specific amount added depends, to some extent, on the amount of iron present in the original phosphoric acid). A convenient source of phosphoric acid for use in the primary cycle stripping is formed by taking a slip stream of clean acid from the initial purification step described above, and either concentrating it or adding a small amount of more concentrated acid, if required, in order to produce the desired $P_2O_5$ concentration in the strip acid. The stripping step is preferably carried out in the organic continuous mode at an organic to acid ratio of about 0.7 to about 1. The barren organic 13 is recycled back to the primary extraction unit.

The loaded strip solution 12 is then subjected to an oxidation step 14 with an oxidizing agent of the type described above, preferably with hydrogen peroxide. In this step the acid soluble $U^{+4}$ values are converted back to the $U^{+6}$ form.

The oxidized strip acid 15 is then contacted again with a DEPA-TOPO extractant 16 in a second countercurrent extraction system in a manner similar to that used in the primary system. The major portion of the lean strip acid 18 is returned to the primary extraction section where it is mixed with the main acid feed stream, although some of the lean strip acid may be recycled.

As described above, the DEPA-TOPO concentrations in the primary extraction cycle conventionally are about 0.5 molar DEPA and 0.125 molar TOPO. According to the preferred ORNL process the secondary extraction cycle is carried out at reduced extractant concentrations of 0.3 M DEPA and 0.075 M TOPO to suppress the coextraction of soluble iron values from the strip acid. As will be described in further detail below, the process of the present invention avoids the problem of iron contamination of the uranium product by precipitating uranium in an acidic medium. Accordingly, it is possible and advantageous to perform the secondary extraction cycle of the process of the present invention at DEPA concentrations of 0.5 M (i.e., at the same level employed for the primary cycle) although DEPA concentration within the range of from about 0.5 to about 0.3 are preferred. The ability to upgrade the secondary extraction concentrations provides a distinct advantage in the overall process in that only one source of DEPA-TOPO mixing need be employed and handling problems are therefore significantly reduced. In addition, the use of the same DEPA-TOPO concentrations in both the primary and secondary cycle provide for the added flexibility of bleeding primary and secondary loaded organics back and forth between the two cycles to achieve better control of the process. For example, if a buildup of iron contamination occurs in the primary cycle, the extractant from this loop can be bled through the secondary cycle with effects precipitation and removal of iron from the system in the later-described dilute carbonate stripping step.

The pregnant organic 18 from the secondary extraction unit is preferably scrubbed with water in scrubber 19 to remove any entrained phosphoric acid which could increase ammonia consumption in later processing. The scrubbed secondary organic 20 is then subjected to a carbonate stripping step in vessel 21. In this stripping step, the uranium values ($U^{+6}$) are stripped from the pregnant secondary cycle organic with a dilute ammonium carbonate solution 22 which results in the formation of a soluble ammonium uranyl tricarbonate (AUT) complex. Preferably the ammonium carbonate is produced in a separate system and fed to the alkaline stripping vessel as an aqueous solution. In general, an ammonium carbonate equivalent concentration of from about 0.25 M to about 1.0 M may be employed as long as conditions are controlled to avoid precipitation of the AUT in the stripping system. Preferred are ammonium carbonate concentrations under 0.5 M with the most preferred concentrations falling in the range of about 0.3 M to 0.4 M. As the concentration of the ammonium carbonate increases, the loading of uranium, of course, drops off. The stripped organic 23 is then contacted with acid 24 (e.g., $H_2SO_4$) in a mixer 25 to reconvert it from the $NH_4$-form to the acid-form which can be recycled to the secondary extraction cycle via line 26.

It is important to closely control the pH and temperature conditions during the above-described carbonate stripping step. Applicants have found that a pH in the narrow range of about 8.2 to about 8.5 is desirable. If the stripping is carried out at a pH much above 8.5 to 9, increased amounts of iron are extracted. If, on the other hand, the ammonium carbonate concentration drops much below about 8.2 uranium extraction falls off significantly. The alkaline stripping step is also preferably carried out at a temperature in the range of about 100° to 125° F. Most preferred, is a temperature of about 115° F. Warm stripping serves to suppress the formation of emulsions which tend to entrain carbonate materials in the organic phase. When the carbonate-containing organic is converted back to the acid form in the acid scrub vessel, the uranium values in the carbonate solution are reextracted by the organic causing the overall efficiency of the system to drop.

The dilute carbonate aqueous strip solution 27 is then acidified with an acid 28 to a pH of about 2 in a stirred tank reactor 29 equipped with an air sparger to assist in removal of liberated $CO_2$. Any mineral acid which will destroy the carbonate ions without introducing an insoluble anion into the system can be employed. Suitable acids include sulfuric acid, nitric acid, hydrochloric acid and phosphoric acid. Sulfuric acid is preferred. Destruction of the carbonate ion and reduction of pH to about 2 is an essential prerequisite to precipitation via the peroxide route. Because the ammonium-form of DEPA is slightly soluble in alkaline solution, the aqueous strip solution from the dilute carbonate stripping stage contains quantities of ammonium-DEPA. Acidulation of such a stripping solution, however, causes the precipitation of highly insoluble waxy derivatives of DEPA. The precipitation of the waxy acid form of DEPA presents a serious obstacle to the utilization of acid precipitation of uranium via the peroxide route. Applicants have unexpectedly discovered that the advantages inherent in the DEPA-TOPO extraction process can be coupled with the advantages inherent in acid precipitation by the peroxide route by treating the strip solution either before or during acidulation with an effective amount of an organic solvent 30 for DEPA waxes such as kerosene. Other known organic hydrocarbon solvents such as Amsco 480, a highly refined petroleum based solvent, may also be employed in this step. In practice, amounts up to about 5 to 10% by volume of the DEPA solvent based on the acid solution are mixed with the acidified solution and sent to a separating stage where settling and air flotation coupled with skimming are effective to remove the organic phase which contains the dissolved DEPA waxy materials.

Hydrogen peroxide 33 is then added to the clarified acidic solution 31 which contains $UO_2^{++}$. The pH is then adjusted with ammonia, via 32, to approximately 3.5 to 4.5, in the precipitator 34, to produce a uranyl peroxide product 35. In association with the precipitation step, a reaction mixture is fed to a settler from which the uranium-containing sludge is withdrawn and washed to remove soluble ammonium salts (e.g., $(NH_4)_2SO_4$) contamination. The sludge is then centrifuged to remove water, and dried, for example, at about 110° C. to produce a uranium concentrate suitable for direct utilization by uranium converters. Unlike the alkaline precipitated AUT processes of the prior art, calcination to remove $CO_2$ from the product of the present invention is not required. Moreover, the peroxide precipitate may be shipped to a converter in the form of a slurry which further eliminates processing steps.

The following example is intended to illustrate more fully the nature of the present invention without acting as a limitation on its scope.

EXAMPLE

Brown phosphoric acid from a conventional wet process phosphoric acid plant containing approximately 27.9% $P_2O_5$ and 0.129 grams per liter of U, at a temperature of about 140° F., was introduced to a purification unit at the rate of about 10 gallons per minute. The acid was cooled in a heat exchanger to 119° F. A bentonite clay was added to the cooled acid in stirred-tank mixer at the rate of about 0.3% by weight of the acid. Flocculant, specifically Nalco 7873, was added at the rate of 15 ppm by weight in a flocculation tank. This material was overflowed from the flocculation tank to a clarifier where the solids were permitted to settle. In this clarification step a major portion of the suspended solids and acid color were removed. In this example the solids in the brown phosphoric acid were 3.12% by volume and the acid was a dark brown color. The partially clarified acid contained 0.14% solids by volume and 58% of the color bodies had been removed, as measured on a spectrophotometer.

This partially clarified acid was then fed to the inlet of a carbon column system at the rate of 8 gallons per minute. The carbon column system was operated in a series upflow expanded bed manner, utilizing five columns approximately 2.5 feet in diameter with a settled carbon bed depth of about 6 feet. The acid leaving the column (clean acid) was light green in color and overall color body removal was approximately 92% as measured on a spectrophotometer.

Hydrogen peroxide was then added to this clean acid and the $Fe^{++}$ was lowered from the original 1.1 grams/liter to 0.07 gram/liter (as $Fe^{++2}$). The $H_2O_2$ (35% concentration by weight) was added at the rate of 2.2 pounds (of 100% peroxide) per ton of 100% $P_2O_5$, as a liquid in a stirred tank. The oxidized material then overflowed to a hold tank for completion of the oxidation and from the hold tank to a surge tank.

Oxidized clean acid was then pumped to the solvent extraction system at the rate of 8.25 gallons per minute. This acid contained uranium in the $U^{+6}$ state in the amount of 0.129 grams per liter (measured as U). This acid was then contacted with 0.5 M DEPA-0.125 M TOPO in a 4 stage countercurrent solvent extraction mixer-settler system. The organic flow rate was about 4.1 gallons per minute. All stages, with the exception of the last mixer-settler unit, were run aqueous continuous. The last stage was run organic continuous to minimize organic entrainment, and in the settler portion of the last stage the $U^{+6}$ loaded primary extractant was separated from the lean acid. The lean acid was further treated to remove entrained extractant to minimize organic losses and then returned to the conventional wet process phosphoric acid plant. The uranium concentration in the lean acid (raffinate) was 0.0038 grams/liter (as U). This represents an extraction efficiency of 97%.

The $U^{+6}$ loaded primary extractant was pumped to a 3 stage countercurrent stripping system where it was contacted with a phosphoric acid strip solution containing 46 grams/liter of dissolved iron as $Fe^{++2}$ and 29% $P_2O_5$. The strip acid flow rate was 558 ml per minute. The loaded primary extractant flow was 4.8 gallons per minute.

The $U^{+6}$ loaded acid strip solution containing 8 grams/liter of uranium (measured as U) was then stored in a surge tank. The primary extractant was reduced from 0.285 grams/liter of U to 0.0018 grams/liter resulting in a stripping efficiency of 99.4%. The extract was then recycled to the primary extraction mixer-settler. About 2.3 days accumulation of the $U^{+4}$ loaded acid strip solution was collected in the surge tank.

Fifty gallons of the $U^{+4}$ loaded acid strip solution was contacted on a batch-basis with 35% hydrogen peroxide solution (1500 ml of the 35% solution). This converts the $Fe^{+2}$ to $Fe^{+3}$ and the uranium values to the $U^{+6}$ form. The contact was permitted for about 3 hours. The resulting $U^{+6}$ loaded acid strip solution containing 8.4 grams per liter of uranium values (calculated as U) was fed to a 4 stage mixer-settler system at the rate of 25 ml/minute. It was contacted with 0.4 M DEPA, 0.1 M TOPO which was fed to the system at the rate of 37.5 ml/minute. In the last mixer settler a $U^{+6}$ loaded secondary extractant was separated from the lean acid strip solution. The lean strip acid was returned to the primary extraction circuit and it contained 0.082 grams per liter of uranium values (as U). The extraction efficiency was 99%.

The $U^{+6}$ loaded secondary extractant (37.5 ml/min.) was contacted with a spent water solution to remove entrained phosphoric acid. The water washed extractant was then contacted with 0.3 M ammonium carbonate solution (15 ml/min). The resulting aqueous ammonium uranyl tricarbonate solution was then separated from the organic extractant. The uranyl tricarbonate solution contained 21.0 grams/liter of uranium values (measured as U). The uranium in the organic extractant was reduced from 5.75 grams/liter of uranium values (measured as U) to 0.107 grams/liter, resulting in a stripping efficiency of approximately 98%. The organic extractant was then mixed with 5 ml/minute of 20% $H_2SO_4$ for the purpose of regenerating the organic extractant. The extractant was then recycled to the secondary extraction circuit. The uranyl tricarbonate solution was then stored for use in the uranium precipitation circuit. During this test the pH in the stripping system ranged from 8.7 to 9.1. This resulted in the undesirable precipitation of iron in the mixer-settlers. In subsequent runs, it was determined that operation of the system within the pH range of about 8.2 to about 8.5 would limit the amount of this undesirable precipitate yet maintain acceptable uranium stripping efficiencies. During the secondary extraction the contact with the aqueous ammonium carbonate was at a temperature of from 100° F. to 120° F.

The separated aqueous ammonium uranyl tricarbonate solution was contacted with 5% sulfuric acid to reduce the pH to 2.0. During this acidification air was sparged into the solution to aid in $CO_2$ removal, which $CO_2$ is formed as the carbonate ions are destroyed. A small amount of kerosene (or a suitable organic solvent for acidified DEPA) was added either prior to or during acidification for the purpose of dissolving DEPA waxes which formed during the acidification stage. The kerosene was used in amount of 5–10% by volume of the amount of solution being treated. If the DEPA waxes were not dissolved they would build up on equipment surfaces and could result in emulsion problems.

The kerosene containing DEPA waxes was then removed from the aqueous acidic solution. The aqueous acid solution was then mixed with 30% $H_2O_2$ at the rate of 0.24 g (100% $H_2O_2$) per gram of uranium values (measured as U). The pH was then adjusted with ammonia to 3.5–4.0. The amount of ammonia used was approximately 0.11 gram $NH_3$ per gram of U. Retention time for this precipitation reaction was approximately 70 minutes although shorter times in other runs were acceptable.

The precipitation uranium peroxide prepared was then separated from the liquid, washed, then dried and analyzed. The uranium precipitation efficiency was 99.9%. The precipitate was dried at 100° C., 200° C. and 550° C., then analyzed. The analyses (based on U) were 68.2%, 79.8% and 83.3% respectively.

While certain specific embodiments of the invention have been described with paticularity herein, it will be recognized that various modifications therefore will occur to those skilled in the art. Therefore, the scope of the invention is to be limited solely by the scope of the appended claims.

We claim:

1. A process for recovering uranium from wet-process phosphoric acid containing hexavalent uranium values comprising:
   (a) contacting said acid with an organic extractant comprising a mixture of di(2-ethylhexyl) phosphoric acid and trioctylphosphine oxide in a phosphoric acidimmiscible organic solvent and separating the resulting uranium loaded primary extractant from the lean acid;
   (b) contacting said uranium loaded primary extractant with a phosphoric acid strip solution containing dissolved $Fe^{++}$ and separating the resulting $U^{+4}$ loaded acid strip solution from said organic extractant;
   (c) contacting said $U^{+4}$ loaded acid strip solution with an oxidizing agent to convert the uranium values to the $U^{+6}$ form;
   (d) contacting the resulting $U^{+6}$ loaded acid strip solution with a second portion of said organic extractant and separating the resulting $U^{+6}$ loaded secondary extractant from the lean acid strip solution;

(e) contacting said $U^{+6}$ loaded secondary extractant with a dilute aqueous ammonium carbonate solution and separating the resulting aqueous ammonium uranyl tricarbonate solution from said organic extractant;

(f) separating any iron or other impurity-containing precipitates that may form in step (e) from said aqueous ammonium uranyl tricarbonate solution;

(g) contacting the aqueous ammonium uranyl tricarbonate solution with a water-immiscible organic solvent for the acidified form di(2-ethylhexyl) phosphoric acid either prior to or during the acidification of step (h);

(h) contacting said aqueous ammonium uranyl tricarbonate solution with an acid in the presence of said organic solvent to form an aqueous acidic solution having a pH of about 2 and removing from said aqueous acidic solution the $CO_2$ formed as the carbonate ions are destroyed;

(i) separating the resulting organic solution containing dissolved DEPA from said aqueous acidic solution; and (j) contacting said aqueous acidic solution with hydrogen peroxide at a pH in the range of about 3.5 to 4.5 to precipitate uranyl peroxide compound.

2. The process of claim 1 wherein said wet process phosphoric acid containing hexavalent uranium values is produced by contacting wet process phosphoric acid with an oxidizing agent for converting uranium values to the hexavalent state.

3. The process of claim 1 additionally comprising the step of purifying said wet process phosphoric acid prior to step (a) to remove potentially interfering contaminants.

4. The process of claim 1 wherein said phosphoric acid strip solution contains from about 25 to about 45 grams of dissolved $Fe^{++}$ per liter.

5. The process of claim 1 wherein said $U^{+4}$ loaded acid strip solution contains about 14 to about 17 grams of $Fe^{++}$ per liter.

6. The process of claim 1 wherein said phosphoric acid strip solution contains from about 28% to about 32% by weight of $P_2O_5$.

7. The process of claim 1 wherein said dilute aqueous ammonium carbonate solution is from about 0.25 M to about 1.0 M in ammonium carbonate.

8. The process of claim 7 wherein said dilute aqueous ammonium carbonate solution is produced in a separate operation and fed to the system as an aqueous solution.

9. The process of claim 1 wherein said loaded secondary extractant is contacted with said dilute aqueous ammonium carbonate solution at a pH in the range of about 8.2 to about 8.5.

10. The process of claim 1 wherein said loaded secondary extractant is contacted with said dilute aqueous ammonium carbonate solution at a temperature of about 100° F. to about 125° F.

11. A process for producing uranium peroxide from an aqueous ammonium uranyl tricarbonate solution obtained by stripping uranium values from an organic extractant containing di(2-ethylhexyl) phosphoric acid with an aqueous ammonium carbonate solution, said process comprising:

(a) contacting said aqueous ammonium uranyl tricarbonate solution with a water-immiscible, organic solvent for the acidified form di(2-ethylhexyl) phosphoric acid either prior to or during the acidification of step (b);

(b) contacting said aqueous ammonium uranyl tricarbonate solution with an acid in the presence of said organic solvent to form an aqueous acidic solution having a pH of about 2 and removing from said aqueous acidic solution the $CO_2$ formed as the carbonate ions are destroyed;

(c) separating the resulting organic solution containing dissolved DEPA from said aqueous acidic solution; and (d) contacting said aqueous acidic solution with hydrogen peroxide at a pH in the range of about 3.5 to 4.5 to precipitate uranium peroxide.

12. The process of claim 1 or 11 additionally comprising the step of drying said uranium peroxide precipitate.

13. A process for removing alkaline-soluble ammonium complexes of di(2-ethylhexyl) phosphoric acid from aqueous alkaline uranium-containing solutions which are to be acidified in subsequent processing to recover uranium values, said process comprising:

(a) adding a water-immiscible organic solvent for the acidified form of di(2-ethylhexyl) phosphoric acid to said alkaline solution just prior to or during acidification; and (b) separating the resulting di(2-ethylhexyl) phosphoric acid containing organic solution from said aqueous solution.

14. The process of claim 1, 11 or 13 wherein said water-immiscible organic solvent for the acidified form of di(2-ethylhexyl) phosphoric acid is kerosene.

* * * * *

UNITED STATES PATENT AND TRADEMARK OFFICE
CERTIFICATE OF CORRECTION

PATENT NO. : 4,302,427

DATED : November 24, 1981

INVENTOR(S) : William W. Berry et al

It is certified that error appears in the above-identified patent and that said Letters Patent are hereby corrected as shown below:

Column 1, line 41, "ORNL-2925" should read -- ORNL-2952 --

Column 2, line 6, "orginal" should read -- original --

Column 6, line 64, "with" should read -- which --

Signed and Sealed this

First Day of June 1982

[SEAL]

Attest:

Attesting Officer

GERALD J. MOSSINGHOFF

Commissioner of Patents and Trademarks